United States Patent
Takizawa et al.

(10) Patent No.: US 7,116,095 B2
(45) Date of Patent: Oct. 3, 2006

(54) WHEEL ROTATION DETECTING DEVICE

(75) Inventors: Takeshi Takizawa, Kanagawa (JP); Shigeru Endo, Kanagawa (JP); Ikunori Sakatani, Kanagawa (JP); Tatsunobu Momono, Kanagawa (JP); Yasushi Mutoh, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/059,420

(22) Filed: Feb. 17, 2005

(65) Prior Publication Data

US 2005/0140357 A1 Jun. 30, 2005

Related U.S. Application Data

(63) Continuation of application No. 10/053,554, filed on Jan. 24, 2002, now Pat. No. 6,894,484.

(30) Foreign Application Priority Data

| Jan. 25, 2001 | (JP) | ............... P. 2001-016851 |
| May 16, 2001 | (JP) | ............... P. 2001-076411 |
| May 21, 2001 | (JP) | ............... P. 2001-150688 |

(51) Int. Cl.
*G01P 3/44* (2006.01)
*F16C 32/00* (2006.01)

(52) U.S. Cl. ............ 324/174; 324/162; 324/207.25; 73/593; 73/660; 384/448

(58) Field of Classification Search ........ 324/173–174, 324/207.25, 162; 384/446, 448; 73/593, 73/660, 494
See application file for complete search history.

(56) References Cited

U.S. PATENT DOCUMENTS

| 3,739,202 A | * | 6/1973 | Cady ............... 310/329 |
| 4,503,351 A | | 3/1985 | Sonderegger et al. |
| 5,372,435 A | | 12/1994 | Genero et al. |
| 5,381,090 A | | 1/1995 | Adler |
| 5,567,058 A | | 10/1996 | Morita et al. |
| 5,899,573 A | | 5/1999 | Morita et al. |
| 5,938,346 A | | 8/1999 | Ouchi |
| 6,161,962 A | | 12/2000 | French et al. |
| 6,229,298 B1 | | 5/2001 | Sakamoto et al. |
| 2002/0030482 A1 | | 3/2002 | Iwamoto et al. |

FOREIGN PATENT DOCUMENTS

| DE | 3937403 | * | 5/1991 |
| EP | 594 550 B1 | | 8/1998 |
| JP | 6-117968 | | 4/1994 |
| JP | 8-29441 | | 2/1996 |
| JP | 2539382 | | 4/1997 |
| JP | 2543369 | | 4/1997 |
| JP | 2000-329593 | | 11/2000 |
| JP | 2001-151090 | | 6/2001 |
| WO | WO 00/51869 A1 | | 9/2000 |

* cited by examiner

*Primary Examiner*—Jay M. Patidar
(74) *Attorney, Agent, or Firm*—Sughrue Mion, PLLC

(57) ABSTRACT

A sensor unit is supported on a stationary ring which does not rotate even when it is in use, and the rotation of the rotary ring can be detected by a rotation detecting sensor held within the sensor unit. Within the sensor unit, besides the rotation detecting sensor, there are disposed other sensors such as a temperature sensor and a vibration sensor, thereby being able to detect the rotation speed and the rotation number of the wheel supported on the rotary ring, and the other car driving conditions.

30 Claims, 12 Drawing Sheets

WHEEL ROTATION DETECTING DEVICE

This is a continuation of application Ser. No. 10/053,554 filed Jan. 24, 2002 now U.S. Pat. No. 6,894,484.

BACKGROUND OF THE INVENTION

1. Field of the Invention

The present invention relates to a wheel rotation detecting device which detects the rotation speed (or rotation number) of a wheel of a car supported on a suspension and also detects the conditions of a rolling bearing unit portion supporting the wheel of the car, such as the temperature or vibration thereof.

2. Description of the Related Art

To obtain the rotation speed of a wheel in order to be able to control an antilock brake system (ABS) or a traction control system (TCS), in the related art, there are known various kinds of wheel supporting rolling bearing units with a rotation speed detecting device each structured such that a rotation speed detecting device is incorporated into a rolling bearing unit used to support the wheel on a suspension of a car. Here, as an example of a wheel supporting rolling bearing unit with a rotation speed detecting device which is used for the above purpose, FIG. 19 shows a wheel supporting rolling bearing unit which is disclosed in Japanese Patent No. 2838701.

An outer ring 1, which corresponds to a stationary ring, is supported on a knuckle forming a suspension by an outward-facing-flange-shaped mounting portion 2 formed on the outer peripheral surface of the outer ring 1 and, even when the rolling bearing unit is in use, the outer ring 1 is not rotatable. A rotary ring 3 is disposed on the inside diameter side of the outer ring 1; and, the rotary ring 3 is structured such that an inner ring 5 is fitted into and fixed to the inner end portion of a hub 4 (here, the term "inner side with respect to the axial direction" means the width-direction central side of the rolling bearing unit with respect to a car; and, in FIGS. 1, 14 and 19, on the right side). Between outer ring raceways 6, 6, which are formed in the inner peripheral surface of the outer ring 1 and respectively serve as stationary side raceways, and inner ring raceways 7, 7 which are formed in the outer peripheral surface of the hub 4 and inner ring 5 and respectively serve as rotary side raceways, there are interposed two rows of rolling elements, that is, balls 8, 8 each row including a plurality of rolling elements in such a manner that they are rollable while they are held by their respective retainers 9, 9.

The above-structured rotary ring 3 is rotatably supported on the inside diameter side of the outer ring 1. On the outer end portion (here, the term "outer side with respect to the axial direction" means the width-direction end portion side of the rolling bearing unit with respect to a car; and, in FIGS. 1, 14 and 19, on the left side) of the hub 4 forming the rotary ring 3, there is disposed a flange 10 which is used to support a wheel (not shown). Also, seal rings 11, 11 are interposed between the inner peripheral surfaces of the two end portions of the outer ring 1 and the middle portion outer peripheral surface of the hub 4 and the outer peripheral surface of the inner end portion of the inner ring 5; and, these seal rings 11, 11 shut off a space 12, in which the balls 8, 8 are disposed, from the outside, thereby being able to prevent grease enclosed in the space 12 from leaking out therefrom to the outside, and also to prevent a foreign substance floating in the outside from moving into the space 12.

Also, an encoder 13 is fitted with and fixed to the outside of the middle portion of the hub 4, namely, the portion extending between the two rows of balls 8, 8 in an interference fit manner. The encoder 13 is formed of magnetic metal material such as soft steel into a circular-ring shape; and, on the outer peripheral surface of the encoder 13, there are formed gear-shaped uneven portions (composed of recessed portions and projected portions) to thereby cause the magnetic characteristics of the present outer peripheral surface to vary alternately and at regular intervals with respect to the circumferential direction. On the other hand, in the middle portion of the outer ring 1, a rotation detecting sensor 14 is inserted into and supported by a mounting hole 15 which is formed in such a manner that it can bring the inner and outer peripheral surfaces of the outer ring 1 into communication with each other; and, a detecting portion, which is formed in the leading end face (in FIG. 19, the lower end face) of the rotation detecting sensor 14, is disposed near to and opposed to the outer peripheral surface of the encoder 13.

When the above-structured wheel supporting rolling bearing unit with a rotation speed detector of the related art is in use while it is assembled between the suspension and wheel, in case where this wheel is rotated, the recessed portions and projected portions existing on the outer peripheral surface of the encoder 13 pass alternately through the detecting surface of the rotation detecting sensor 14. As a result of this, the density of magnetic flux flowing in the rotation detecting sensor 14 varies, whereby the output of the rotation detecting sensor 14 varies. A frequency, at which the output varies, is in proportion to the rotation speed of the wheel and, therefore, in case where the output signal of the rotation detecting sensor 14 is sent to a control unit (not shown), the ABS or TCS can be controlled properly. Also, the rotation number of the wheel can be obtained from the number of times of the variations of the output of the rotation detecting sensor 14. Thanks to this, recently, the output signal of the rotation detecting sensor 14 has been used as a signal to control not only the ABS and TCS but also a car navigation system and an ITS (Intelligent Transport System).

In the case of the above-mentioned wheel supporting rolling bearing unit with a rotation speed detector of the related art, the rotation speed and rotation number of the wheel can be detected but the other conditions of the wheel supporting rolling bearing unit cannot be detected. On the other hand, due to the rapid progress of a car technology in recent years, there arises the need to obtain more pieces of information from the wheel supporting rolling bearing unit.

For example, in case where it is possible to know the temperature of a wheel supporting rolling bearing unit portion of a car, an increase in the temperature of the wheel supporting rolling bearing unit portion and the overheated condition of a brake portion of a car can be detected. The increase in the temperature of the wheel supporting rolling bearing unit portion not only provides important data in knowing the life of the present wheel supporting rolling bearing unit itself but also can show the overheated condition of the brake portion to thereby give a warning to a driver before a dangerous condition such as vapor lock occurs. By the way, in case where a speed signal from a rotation detecting sensor is combined with a temperature signal from a temperature sensor, generation of heat due to the friction loss of the present rolling bearing unit can be corrected. Therefore, even in a moving body such as a vehicle in which the temperature always varies according to variations in the rotation speed, the accuracy of detection of the temperature in the abnormality of the present rolling bearing unit can be enhanced. Also, by measuring the magnitude of the vibrations and the wavelengths of the wheel supporting rolling bearing unit portion and by analyzing the frequencies thereof, there can be obtained important data in knowing the life of the wheel supporting rolling bearing unit in addition to the conditions of the road surfaces and the conditions of the air pressures of tires. In case where proper knowledge of the road conditions is obtained, the automatic change of the damping force of a damper attached to the suspension can be executed properly; and, in case where the tire air pressure can be estimated, it is possible not only to give a warning when the tire air pressure is abnormal but also to increase or decrease the tire air pressure. This can prevent an accident such as tire burst which may occur when a vehicle runs at a high speed with a low tire air pressure. Further, a proper knowledge of the life of the wheel supporting rolling bearing unit can tell the driver the remaining life thereof before the car becomes impossible to run any further and thus can give a warning to the driver in such a condition that the driver can drive the car up to a garage.

To know the above-mentioned temperatures and vibrations, a temperature sensor and a vibration sensor (an acceleration sensor) may be assembled to a portion of the wheel supporting rolling bearing unit. However, in case where these sensors are assembled independently of the rotation detecting sensor, the weight and assembling space of the wheel supporting rolling bearing unit increase, and the number of assembling man-hour increases to thereby increase the manufacturing cost of the car unfavorably.

SUMMARY OF THE INVENTION

The present invention aims at eliminating the above-mentioned drawbacks found in the wheel rotation detecting device of the related art. Accordingly, it is an object of the invention to provide a wheel rotation detecting device which is capable of detecting the rotation speed or rotation number of a wheel supported on a rotary ring and the other conditions such as temperatures and vibrations helpful in driving a car.

In attaining the above object, according to the invention, there is provided a wheel rotation detecting device which, similarly to a conventionally known wheel rotation detecting device such as the above-mentioned wheel supporting rolling bearing unit with a rotation speed detector, comprises a stationary ring, a rotary ring, a plurality of rolling elements, and encoder, and a rotation detecting sensor (a first sensor).

In the present wheel rotation detecting device, the stationary ring is supported on a suspension of a car and does not rotate even when it is in actual use.

And, the rotary ring, in a state where it supports a wheel thereon, can rotate together with the wheel.

Also, the rolling elements are rollably interposed between a stationary side raceway formed in the peripheral surface of the stationary ring and a rotary side raceway formed in the peripheral surface of the rotary ring.

The encoder is used to detect the rotation of the rotary ring and is supported on the rotary ring or on a part mounted on the rotary ring.

The rotation detecting sensor, with a detecting portion thereof opposed to the encoder, is supported on the stationary ring itself, or a part fixed to the stationary ring such as a cover or a portion of the suspension.

Especially, in the present wheel rotation detecting device according to the invention, within a holder holding the rotation detecting sensor as a first sensor therein, besides the rotation detecting sensor, there is disposed at least a second sensor which is used to detect the condition of a wheel supporting rolling bearing unit portion of a car.

As the second sensor, for example, there can be used a temperature sensor for monitoring the temperature of the wheel supporting rolling bearing unit portion, or a vibration sensor (an acceleration sensor) for measuring the vibrations of the present wheel supporting rolling bearing unit portion.

According to the above-structured wheel rotation detecting device of the invention, similarly to the previously-described wheel rotation detecting device of the related art, the wheel can be rotatably supported on the suspension and, at the same time, using the rotation detecting sensor, one or both of the rotation speed and rotation number of the wheel in the car running condition can be detected. Further, using the second sensor, the other conditions of the wheel supporting rolling bearing unit portion such as the temperature and vibration thereof than the rotation speed of the wheel can be detected.

Moreover, since the second sensor is disposed within a holder holding the rotation detecting sensor therein, there is no possibility that the second sensor may increase the weight and assembling space of the wheel supporting rolling bearing unit portion and may increase the number of assembling man-hour to thereby increase the manufacturing cost of a car unfavorably. Also, in case where the second sensor is a temperature sensor, this temperature sensor is disposed within the same holder holding therein other sensors including the rotation detecting sensor, the detect signal of the temperature sensor can be used to correct the outputs of the other sensors according to the temperatures, which makes it possible to further enhance the accuracy of the detected data.

DETAILED DESCRIPTION OF THE PREFERRED EMBODIMENTS

Figure 1:
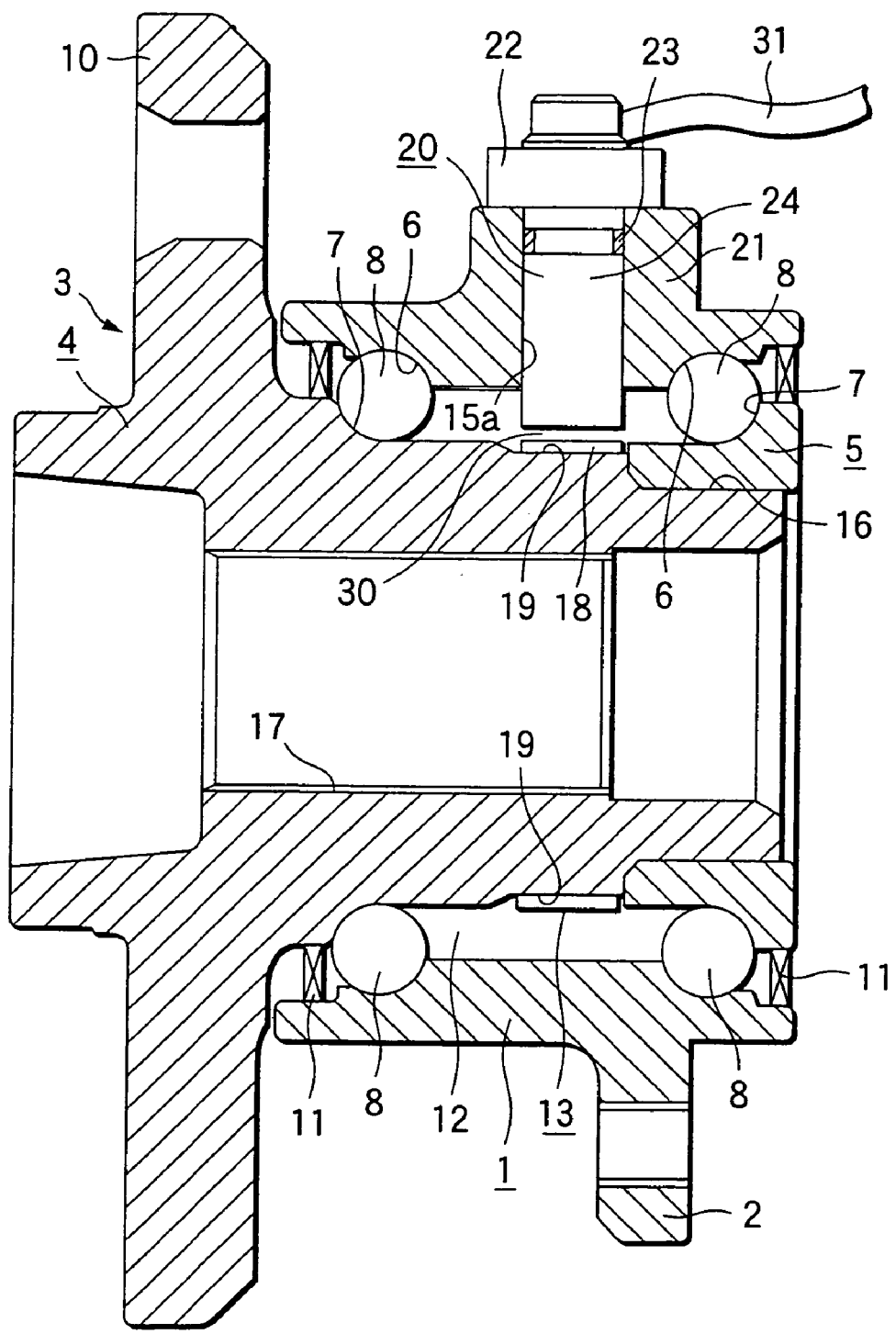
FIG. 1 is a section view of a first embodiment according to the invention.
Figure 2:
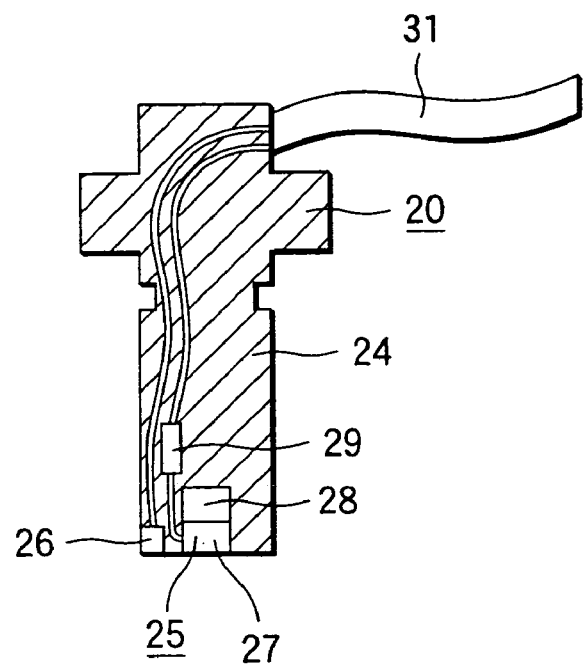
FIG. 2 is a section view of a sensor unit to be incorporated into the first embodiment.

Now, FIGS. 1 and 2 shows a first embodiment according to the invention. In the first embodiment, a hub 4 formed in a hollow cylindrical shape has a flange 10 on the outer peripheral surface of the outer end portion thereof. A wheel and a disk rotor forming a brake device are fixed to a flange 10 by a plurality of studs (not shown). On the outer peripheral surface of the middle portion of the hub 4, there is formed an outside inner ring raceway 7, while an inner ring 5 including an inside inner ring raceway 7 on the outer peripheral surface thereof is fitted into and fixed to the outer portion of a stepped portion 16 provided on the inner end portion of the hub 4, thereby forming a rotary ring 3. A spline hole 17 is formed in the central portion of the hub 4 forming the thus-structured rotary ring 3; and, in an assembling state of a car, a spline shaft attached to a constant velocity universal joint (not shown) is inserted into the spline hole 17.

On the other hand, on the periphery of the rotary ring 3, there is disposed an outer ring 1 concentrically with the rotary ring 3, while the outer ring 1 includes a double row of outer ring raceways 6, 6 formed on the inner peripheral surface thereof and a mounting portion 2 formed on the outer peripheral surface thereof. The mounting portion 2 is used to support and fix the outer ring 1 onto a suspension (not shown) such as knuckle. Also, two groups of a plurality of balls 8, 8, each forming a rolling element, are interposed between the outer ring raceways 6, 6 and the inner ring raceways 7, 7, whereby the rotary ring 3 for fixing the wheel thereto can be rotatably supported on the inside diameter side of the outer ring 1 to be fixed to the suspension. By the way, in the case of a car rolling bearing unit which is heavy in weight, as the rolling elements, instead of the illustrated balls 8, 8, there can also be used tapered rollers. Also, instead of the outside inner ring raceway 7 being directly formed on the outer peripheral surface of the hub 4, it can also be formed on the outer peripheral surface of an inner ring which is disposed separately.

Also, seal rings 11, 11 are interposed between the inner peripheral surfaces of the two end portions of the outer ring 1 and the outer peripheral surface of the middle portion of the hub 4, the outer peripheral surface of the inner end portion of the inner ring 5. The seal rings 11, 11 are respectively used to close the openings of the two end portions of a space 12 in which the plurality of balls 8, 8 are disposed. And, the seal rings 11, 11 prevent grease enclosed into the space 12 from leaking therefrom to the outside and also prevent foreign substances floating in the outside from moving into the space 12.

Also, a cylindrical surface portion 18 is formed in the portion of the outer peripheral surface of the middle portion of the hub 4 that extends between the outside inner ring raceway 7 and the stepped portion 16, and the cylindrical surface portion 18 is concentric with the hub 4. And, an encoder 13 is fitted with and fixed to the outer portion of the cylindrical surface portion 18 in an interference fit manner. The encoder 13 is made of a magnetic metal plate such as an SPCC steel plate and is formed in a cylindrical shape as a whole and, in the axial-direction middle portion of the encoder 13, there are formed a large number of through holes 19, 19 at regular intervals along the circumferential direction thereof, while these through holes 19, 19 function as component reducing portions of the encoder 13. These through holes 19, 19 are respectively formed in a slit which is long in the axial direction thereof (in FIG. 1, in the right and left direction). Also, the portions extending between the through holes 19, 19 mutually adjoining in the circumferential direction of the encoder 13 are formed in pillar portions which function as solid portions. This structure allows the magnetic characteristic of the axial-direction middle portion outer peripheral surface of the encoder 13 to vary alternately and at regular intervals along the circumferential direction thereof.

On the other hand, a mounting hole 15a is formed in the portion of the axial-direction middle portion of the outer ring 1 that is opposed to the outer peripheral surface of the encoder 13, while the mounting hole 15a penetrates through the outer peripheral surface of the outer ring 1 up to the inner peripheral surface thereof. And, a sensor unit 20 is inserted into the mounting hole 15a from an opening which is formed on the outside diameter side of the outer ring 1, while the leading end face (in FIG. 1, lower end face) of the sensor unit 20 is disposed near to and opposed to the peripheral surface of the encoder 13. In order that the sensor unit 20 can be freely inserted into the mounting hole 15a in this manner, the mounting portion 2 is formed such that it is discontinuous in the portion thereof existing in the periphery of the outside diameter side opening of the mounting hole 15a and, instead, a mounting seat 21 is formed on the outer peripheral surface of the outer ring 1. By screwing a flange 22 formed in the base end portion (in FIG. 1, the upper end portion) of the sensor unit 20 to the mounting seat 21, the sensor unit 20 can be fixed to the outer ring 1. Also, an O-ring 23 is interposed between the inner peripheral surface of the mounting hole 15a and the outer peripheral surface of the sensor unit 20, to thereby seal between these surfaces.

In the case of the sensor unit 20, as shown in FIG. 2, within a holder (case) 24 formed of synthetic resin, there are disposed (embedded and supported) a rotation detecting sensor 25 and a temperature sensor 26. The rotation detecting sensor 25 comprises a magnet detect element 27, a permanent magnet 28 and a waveform shaping circuit 29. The magnet detect element 27 is formed by a hall element, an MR element or the like and varies its characteristic according to the quantities of magnetic flux passing therethrough. The permanent magnet 28 is a source of generation of magnetic flux passing through the magnet detect element 27 and is magnetized in the vertical direction in FIG. 2. Further, the waveform shaping circuit 29 shapes the waveform of a signal (arranging the signal into a square wave) issued according to variations in the characteristic of the magnet detect element 27. And, the magnet detect element 27 is disposed near to and opposed to the axial-direction middle portion outer peripheral surface of the encoder 13 with a minute clearance 30 between them. On the other hand, the temperature sensor 26, which is composed of a thermistor, is embedded into and supported by the leading end portion of the holder 24 and is free to detect the temperature of the interior of the space 12 within which the balls 8, 8 are disposed. The detect signals of the rotation detecting sensor 25 and temperature sensor 26, which form the sensor unit 20, are taken out through a harness 31 guided from the base end face of the holder 24 and are then transmitted to a control unit (not shown).

The rotation detecting sensor 25 forming the above-mentioned sensor unit 20 detects one or both of the rotation speed and rotation number of the wheel in the following manner. That is, when the encoder 13 fitted with and fixed to the outer portion of the hub 4 is rotated as the wheel is rotation, the through holes 19, 19 formed in the axial-direction middle portion of the encoder 13 and the pillar portions existing between the through holes 19, 19 mutually adjoining in the circumferential direction of the encoder 13 pass alternately through the vicinity of the magnet detect element 27. As a result of this, the quantities of magnetic flux flowing in the magnet detect element 27 vary, which causes the output of the rotation detecting sensor 25 to vary. Since a frequency at which this output varies is in proportion to the rotation speed of the wheel, in case where the output signal is input to the control unit (not shown) through the harness 31, the rotation speed of the wheel can be found as well as the ABS and TCS can be controlled properly. Also, because the rotation number of the wheel can be obtained from the number of times of variations of the present output and also the running distance of the car can be found from the thus-obtained rotation number, the rotation detecting sensor 25 can be used to control a car navigation system.

On the other hand, the temperature sensor 26 detects the temperature of the interior of the space which is present within the wheel supporting rolling bearing unit and similarly sends a detect signal through the harness 31 to the control unit (not shown). And, this makes it possible to confirm an increase in the temperature of the wheel supporting rolling bearing unit portion and the overheated condition of the brake. The increase in the temperature of the wheel supporting rolling bearing unit portion not only provides important data in knowing the life of the wheel supporting rolling bearing unit itself but also can tell the overheated condition of the brake and thus can give an alarm to the driver before a dangerous condition such as vapor lock occurs.

By the way, because the overheated condition of the brake is transmitted from the disk rotor to the hub 4, preferably, the temperature sensor 26 may be disposed on the leading end face of the sensor unit 20 in such a manner that it is situated near to and opposed to the hub 4. On the other hand, the increase in the temperature of the wheel supporting rolling bearing unit portion can also be found from the temperature of the outer ring 1. And, in order to measure the temperature of the outer ring 1, the temperature sensor 26 may also be disposed on the portion of the middle portion of the holder 24 that is opposed to the inner peripheral surface of the mounting hole 15a. In any case, by disposing the temperature sensor 26 in such a manner that it is situated near to or in contact with the portion to be measured, the temperature of the portion to be measured can be measured accurately, the abnormality of the wheel supporting rolling bearing unit and the overheated condition of the brake can be detected at an early stage thereof, and thus an alarm can be issued properly.

Also, since the temperature sensor 26, which functions as the second sensor, is embedded into and supported on the interior of the same holder 24 for holding the rotation detecting sensor 25, the provision of the temperature sensor 26 neither increases the weight and assembling space of the sensor unit 20 excessively nor increases the number of assembling man-hour; and, therefore, the provision of the temperature sensor 26 does not increase the manufacturing cost of the car unfavorably. And, conductors, which are used to transmit the detect signals of the respective sensors 25, 26 to the control unit, can be collected together into the single harness 31 which is stored within the same sheath. This makes it possible to reduce the weight of the harness 31 and simplify the wiring operation.

Figure 3:
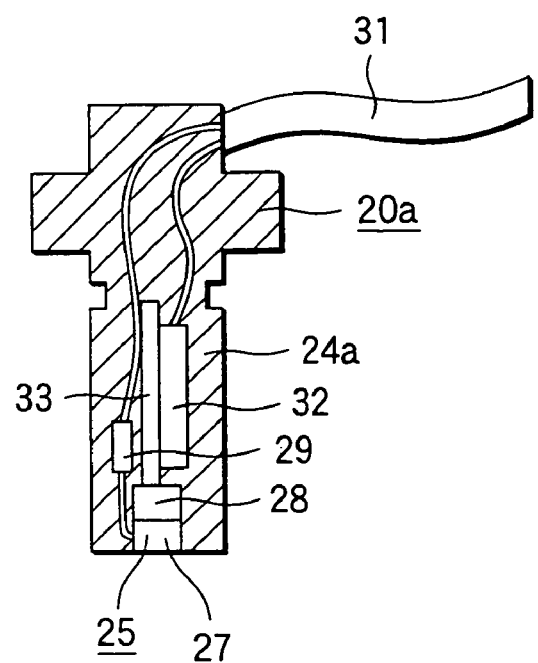
FIG. 3 is a section view of a sensor unit to be incorporated into a second embodiment according to the invention.

Next, FIG. 3 shows a second embodiment according to the invention. Specifically, a sensor unit 20a employed in the present embodiment comprises, within a holder 24a formed of synthetic resin, not only a magnet detect element 27, a permanent magnet 28, and a waveform shaping circuit 29 respectively used to form a rotation detecting sensor 25 but also a vibration sensor 32 which is used as a second sensor, while these components are respectively embedded in and supported by the holder 24a. The vibration sensor 32 is structured such that, for example, a small-sized acceleration sensor using a piezoelectric element and a signal processing circuit are mounted on a substrate 33 and, in this state, they are molded into the holder 24a. Referring to the position of the vibration sensor 32, in order to be able to make the sensor unit 20a compact as a whole, preferably, as shown in FIG. 3, with respect to the axial direction (in FIG. 3, the vertical direction) of the holder 24a, the vibration sensor 32 may be disposed in series with the magnetic detect element 27 and permanent magnet 28 and nearer to the base end side (in FIG. 3, the upper end side) of the holder 24a than these two components.

The structure of the second embodiment in which the above sensor unit 20a is fixed to the outer ring 1 (see FIG. 1) forming a wheel supporting rolling bearing unit and the output signals of the sensors 25, 32 are taken out, and also the operation of the second embodiment to detect the rotation speed of the wheel using the rotation detecting sensor 25 are similar to those in the previously described first embodiment.

Especially, in the case of the present embodiment, since the vibration sensor 32 is embedded into and supported by the synthetic-resin-made holder 24a and is thereby united with the sensor unit 20a as an integral body and the thus-integrally-united sensor unit 20a is fixed to the outer ring 1 with no play between them, the vibrations of the outer ring 1 can be measured with accuracy. Because the vibrations transmitted from the wheel to the hub 4 are transmitted to the outer ring 1 through the balls 8, 8 (see FIG. 1), in case where a signal output from the vibration sensor 32 is input into a control unit (not shown), the uneven portions of the road surface with which the wheel is in contact, the air pressure of the tire, and the acceleration or deceleration conditions of the car can be detected. And, the damping amount of a damper incorporated into the suspension can be automatically adjusted and the output of the engine can be controlled. Also, an abnormal vibration, which occurs because the wheel supporting rolling bearing unit reaches its lifetime, can be detected and thus an alarm can also be given to the driver properly.

Figure 4A:
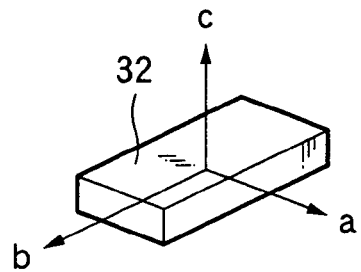
FIGS. 4A to 4C are explanatory perspective views of an installation state when there is used a vibration sensor capable of detecting only the vibration in one direction.

By the way, the vibrating direction to be detected by the vibration sensor 32 can be freely adjusted by regulating the direction of the vibration sensor 32 in a state (in a mounted state) where the wheel supporting rolling bearing unit is supported on the suspension. For example, assuming that the vibration sensor 32 is composed of an ordinary piezoelectric element, the vibrating direction detectable by the vibration sensor 32 is any one of an a-axis direction, a b-axis direction and a c-axis direction respectively shown in FIG. 4A. Vibrations applied in directions at right angles to these respective axes can be little detected, whereas, in the case of vibrations applied in directions inclined with respect to these axes, the vibration components parallel to these axes can be detected.

Figure 4B:
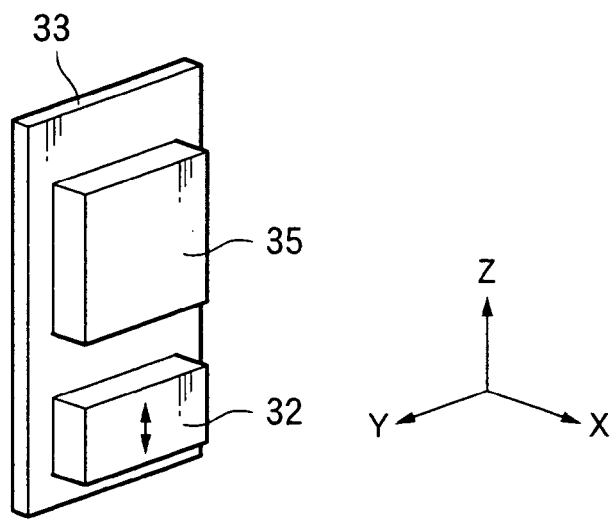
Figure 4C:
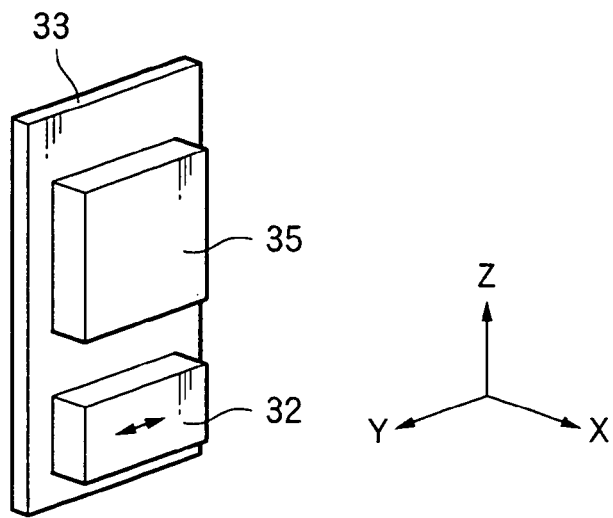

Therefore, here, states shown in FIGS. 4B and 4C are taken as examples of the mounted or installation states of the vibration sensor 32; and, with respect to these mounted states of FIGS. 4B and 4C, the x direction is assumed to be the transverse direction of a vehicle, the Y direction is assumed to be the longitudinal direction of the vehicle and the Z direction is assumed to be the vertical direction of the vehicle. That is, under such assumption, the vibration detection is checked. By the way, in the states of FIGS. 4B and 4C {and, in states shown in FIGS. 5A to 5C and 6A to 6C which will be discussed later }, arrow marks shown within the vibration sensor 32 respectively express the vibration directions to be detected by the vibration sensor 32. Firstly, as shown in FIG. 4B, in case where the detecting direction of the vibration sensor 32 is coincident with the Z direction, the vibrations in the vertical direction of the vehicle can be detected effectively, whereas the vibrations in the advancing direction and in the transverse direction cannot be detected. Also, in the case of the vibrations applied in the inclined direction with respect to the vertical direction, the components thereof in the vertical direction can be detected. Next, as shown in FIG. 4C, in case where the detecting direction of the vibration sensor 32 is coincident with the Y direction, the vibrations in the longitudinal direction of the car can be detected effectively, whereas the vibrations in the vertical direction and in the transverse direction cannot be detected. Also, in the case of the vibrations applied in the inclined direction with respect to the longitudinal direction, the components thereof in the longitudinal direction can be detected. By the way, in FIGS. 4B and 4C (and FIGS. 5A–6C which will be discussed later), reference character 35 designates a signal processing circuit which is used to process the detect signals of the vibration sensor 32.

Figure 5A:
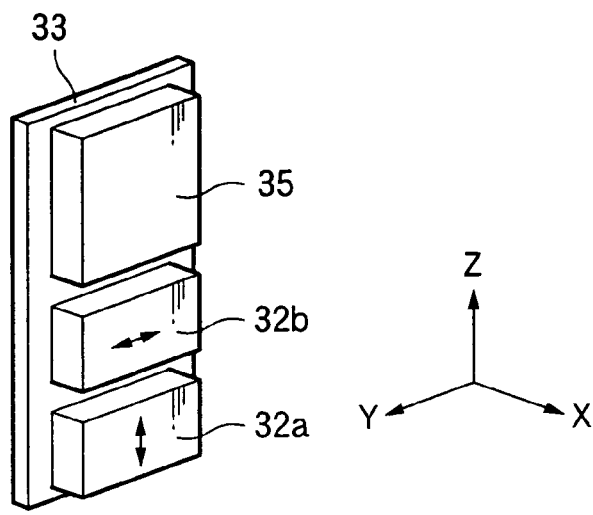
FIGS. 5A to 5C are explanatory perspective views of an installation state when there is used a vibration sensor capable of detecting vibrations in two directions.
Figure 5B:
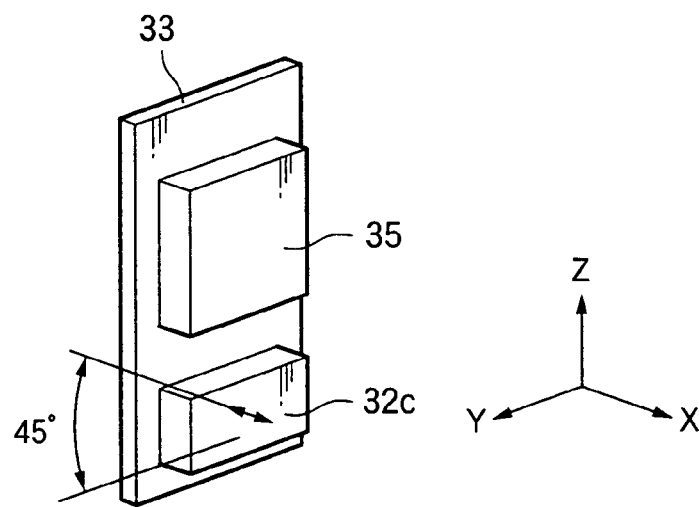
Figure 5C:
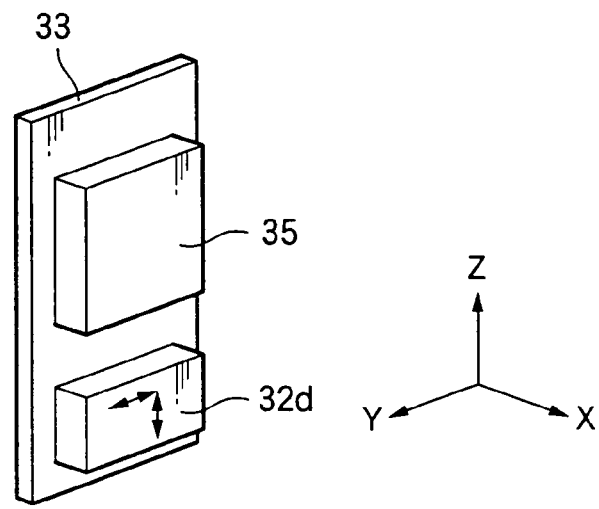

Also, as shown in FIG. 5, by properly selecting the number of vibration sensors mounted, the mounting directions thereof, and the kinds thereof, the vibrations in two of the X, Y and Z directions can be detected. Firstly, as shown in FIG. 5A, in case where not only two vibration sensors 32a, 32b are fixed to a single substrate 33 but also the detecting direction of one vibration sensor 32a {in FIG. 5A, the lower vibration sensor} is made to coincide with the Z direction and the other vibration sensor 32b {in FIG. 5A, the upper vibration sensor} is made to coincide with the Y direction, the vibrations in the vertical and longitudinal directions can be detected effectively, whereas the vibrations in the transverse direction cannot be detected. In the case of the vibrations applied in the inclined directions with respect to the vertical and transverse directions, the components thereof in the vertical and longitudinal directions can be detected. Next, as shown in FIG. 5B, in case where there is used a vibration sensor 32c the detecting direction of which is a direction intermediate between the Y and Z directions (that is, a direction having an angle of 45° with respect to the Y and Z directions), the vibrations in the longitudinal direction and the vibrations in the vertical direction can be detected as the resultant forces thereof. In this case, the vibrations in the transverse direction cannot be detected but, by changing the detecting direction, the vibrations in the transverse direction can also be detected, or, the vibrations in the transverse direction and the vibrations in the longitudinal or vertical direction can be detected as the resultant forces thereof. Further, as shown in FIG. 5C, in case where there is used a vibration sensor 32d capable of detecting vibrations in two directions intersecting at right angles with each other and the detecting direction of the vibration sensor 32d is made to coincide with the Y and Z directions, the vibrations in the longitudinal and vertical directions can be detected, whereas the vibrations in the transverse direction cannot be detected. By the way, the combination of the detecting directions is not limited to the above-mentioned combination of the Y and Z directions but any of combinations of the X and Z directions and the X and Y directions can also be used.

Figure 6A:
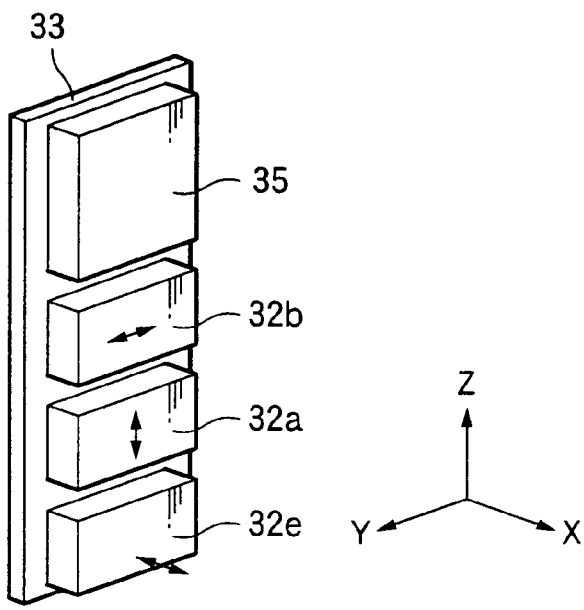
FIGS. 6A to 6C are explanatory perspective views of an installation state when there is used a vibration sensor capable of detecting vibrations in three directions.
Figure 6B:
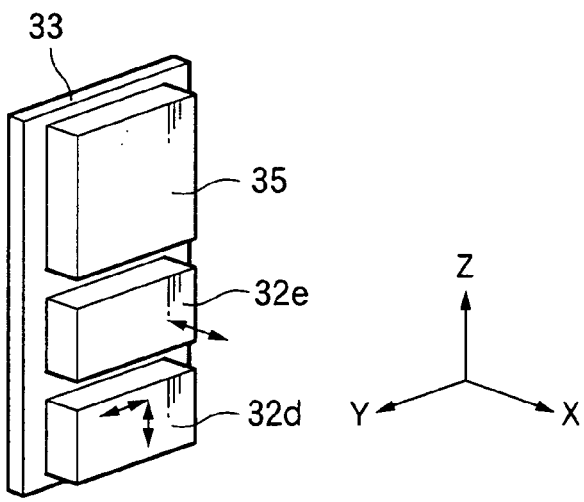
Figure 6C:
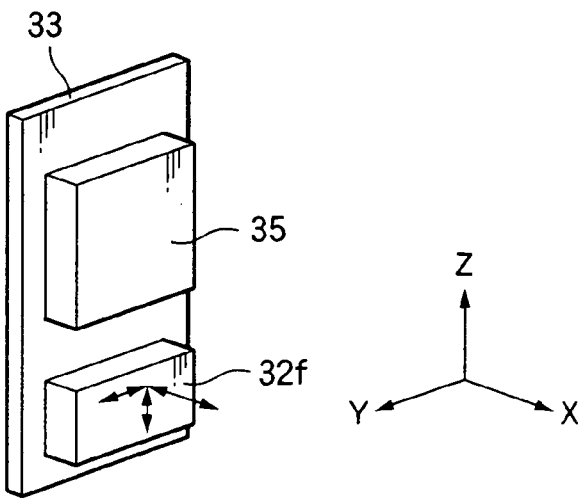

Further, as shown in FIGS. 6A to 6C, by properly selecting the number of vibration sensors to be mounted, the mounting directions thereof, and the kinds thereof, the vibrations in all of the X, Y and Z directions can be detected. Firstly, as shown in FIG. 6A, in case where not only three vibration sensors 32a, 32b, 32e are fixed to a single substrate 33 but also the detecting directions of these three vibration sensors 32a, 32b, 32e are made to respectively coincide with the X, Y, and Z directions, the vibrations in the transverse, longitudinal and vertical directions can all be detected effectively. Next, as shown in FIG. 6B, even in case where there are mounted a vibration sensor 32e having a detecting direction coincident with the X direction and a vibration sensor 32d having a detecting direction coincident with the Y and Z directions, the vibrations in the transverse, longitudinal and vertical directions can all be detected effectively. Further, as shown in FIG. 6C, even in case where there is used a vibration sensor 32f capable of detecting the vibrations in three directions intersecting at right angles with one another and the detecting direction of the vibration sensor 32f is made to coincide with the X, Y and Z directions, the vibrations in the transverse, longitudinal and vertical directions can all be detected effectively. In a word, according to vibration information required, proper vibration sensors may be used in a proper number.

Figure 7:
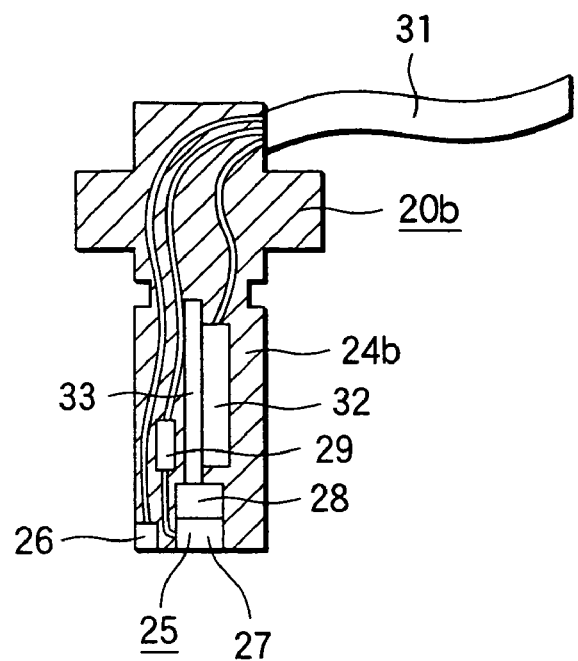
FIG. 7 is a section view of a sensor unit to be incorporated into a third embodiment according to the invention.

Next, FIG. 7 shows a third embodiment according to the invention. Specifically, a sensor unit 20b employed in the present embodiment comprises, within a holder 24b formed of synthetic resin, a rotation detecting sensor 25 and a temperature sensor 26 and a vibration sensor 32 respectively used as second sensors, while these components are respectively embedded in and supported by the interior of the holder 24b. The operation of the temperature sensor 26 is similar to that of the first embodiment and the operation of the vibration sensor 32 is similar to that of the second embodiment. Therefore, the equivalent parts thereof are given the same designations and thus the duplicate description thereof is omitted here. By the way, as the vibration sensor 32, any one of the vibration sensors shown in FIGS. 4A–6C can be used.

Figure 8:
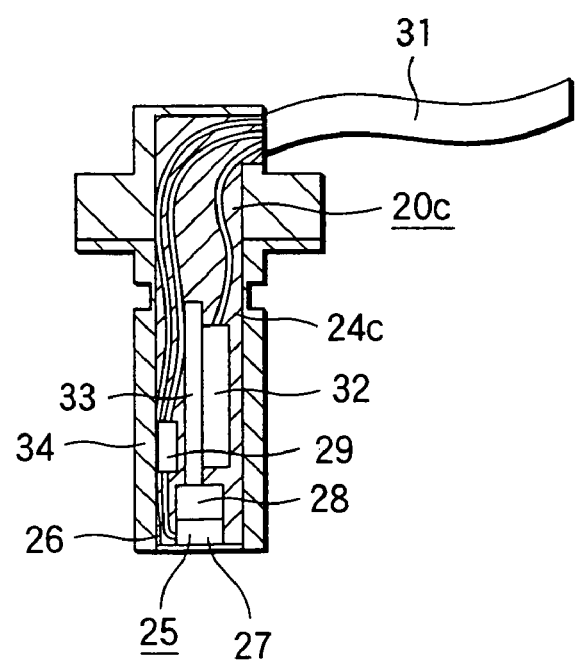
FIG. 8 is a section view of a sensor unit to be incorporated into a fourth embodiment according to the invention.

Next, FIG. 8 shows a fourth embodiment according to the invention. Specifically, in the case of a sensor unit 20c used in the present embodiment, a synthetic-resin-made holder 24c including a rotation detecting sensor 25, a temperature sensor 26 and a vibration sensor 32 embedded therein is held within a case 34 which is made of non-magnetic metal such as aluminum, copper and non-magnetic stainless steel. Provision of such case 34 not only can enhance the strength of the sensor unit 20c but also makes it hard for the rotation detecting sensor 25 to be influenced by external magnetic flux. By the way, the structure using such case 34 can also be combined with the structure used in the first embodiment shown in FIG. 2, or the structure used in the third embodiment shown in FIG. 7. In the present embodiment as well, as the vibration sensor 32, any one of the vibration sensors shown in FIGS. 4A–6C can be used.

Also, the encoder 13 (see FIG. 1) may be a gear-like device having uneven portions (projected and recessed portions) alternately formed in the peripheral direction thereof, or may be a multi-pole magnet having S and N poles formed alternately at regular intervals with respect to the circumferential direction thereof. In case where an encoder made of a multi-pole magnet is used, the permanent magnet on the rotation detecting sensor side can be omitted. Description will be given below of a specific structure, in which such encoder made of a multi-pole magnet is used, with reference to the fifth to eighth embodiments of the invention respectively shown in FIGS. 9 to 13. Further, the kinds and structures of the vibration sensor 32, substrate 33 and signal processing circuit 35 cooperating together in forming the vibration detector are not limited to those described above. For example, the vibration sensor 32 may be of other types than the piezoelectric type, such as an electrostatic capacity type, a strain gauge type, and a micro-machine type, or may incorporate the signal processing circuit 35 therein, or may be composed of an IC device. Also, as the temperature sensor, besides the above-mentioned thermistor, there can also be used a thermoelectric couple, a platinum temperature measuring member, or a temperature measuring IC. Further, in the illustrated embodiment, between the balls 8, 8 which function as rolling elements, there are interposed the sensor unit 20 and encoder 13. However, the invention is not limited to this structure but, for example, these parts 20, 13 may be disposed outside or inside the balls 8, 8; or, the encoder 13 may be disposed on the end face of the rotary ring or a seal and the sensor unit 20 may be disposed such that it is opposed to the encoder 13. In short, the encoder 13 may be disposed on the rotary ring or on a part rotatable with the rotary ring, and the sensor unit 20 may be disposed on the stationary ring or a part mounted on the stationary ring. In this respect, various modifications are possible without departing from the scope of the invention.

Figure 9:
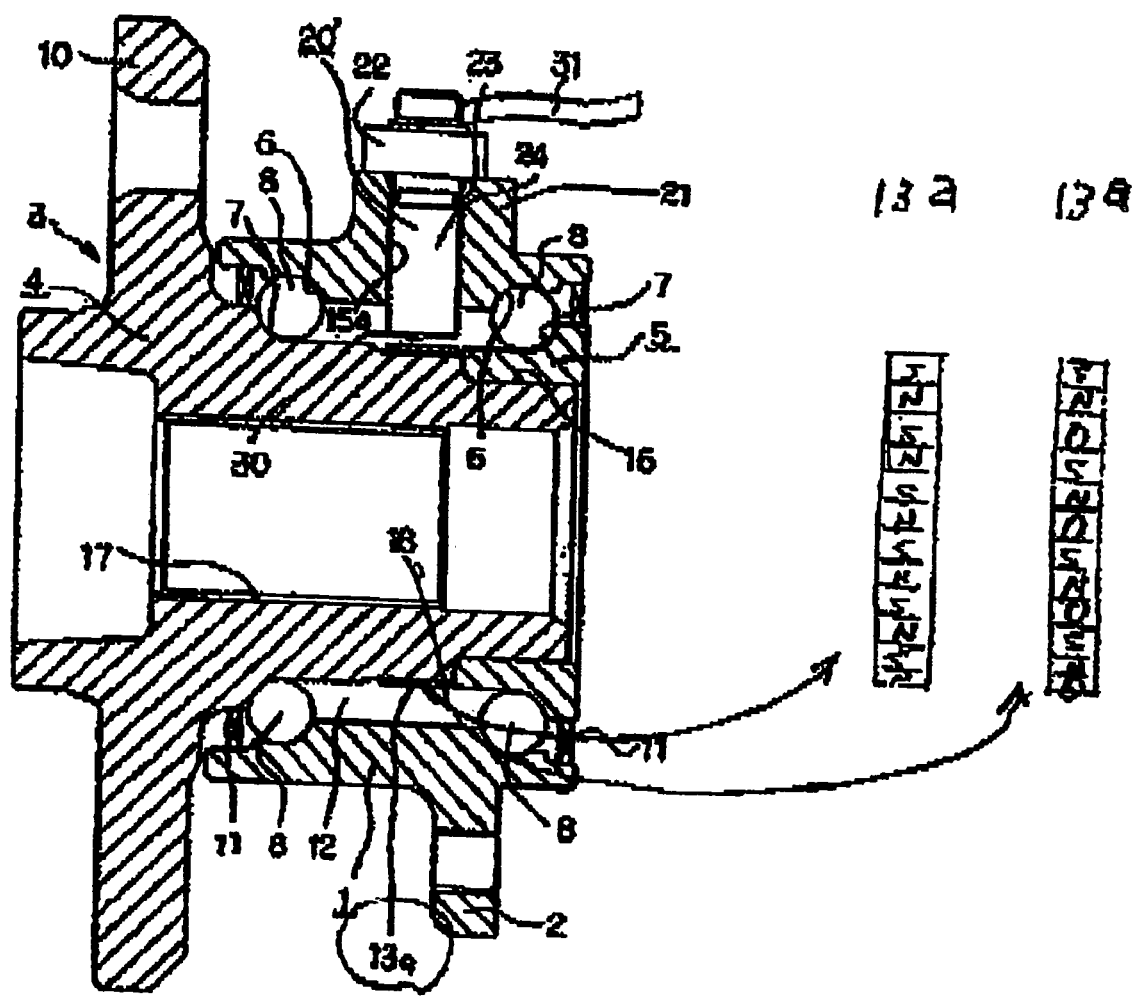
FIG. 9 is a section view of a fifth embodiment according to the invention.
Figure 10:
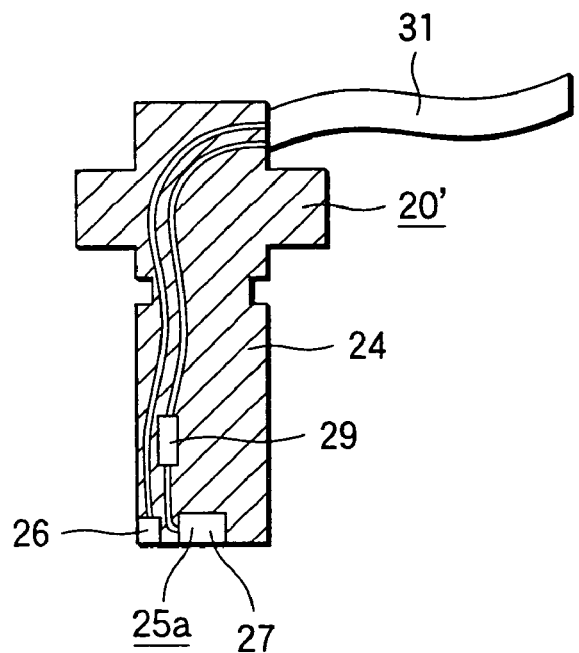
FIG. 10 is a section view of a sensor unit to be incorporated into the fifth embodiment.

Next, FIGS. 9 and 10 show a fifth embodiment according to the invention. In the present embodiment, as an encoder 13a which is fitted with and fixed to the outer portion of the hub 4 in order to detect the rotation speed of the hub 4, there is used an encoder made of a permanent magnet. This encoder 13a can be formed such that an encoder main body made of a rubber magnet including ferrite powder or rare earth system magnet powder mixed therein is attached to the whole of the outer peripheral surface of a cylindrical-shaped core. The encoder main body may also be made of a plastic magnet or a bonded magnet. Also, the core may be formed of metal or synthetic resin. More preferably, the core may be made of a magnetic metal plate such as a steel plate, because the intensity of magnetic flux generated from the outer peripheral surface of the encoder main body can be increased: that is, even in case where the minute clearance 30 between the outer peripheral surface of the encoder main body and the detecting portion of the rotation detecting sensor disposed within the holder 24 is widened, the reliability of the rotation detection can be secured. Further, the encoder 13a may also be structured in the following manner: that is, the core metal is omitted and the encoder main body is directly fixed by resin molding or by adhesion to the outside diameter surface of the hub 4.

In any case, the encoder main body is magnetized in the diameter direction thereof and the magnetizing directions of the encoder main body vary alternately at regular intervals with respect to the circumferential direction thereof. Therefore, on the outer peripheral surface of the encoder 13a, there are disposed S and N poles alternately at regular intervals with respect to the circumferential direction thereof. By the way, generally, the magnetizing pattern of the encoder main body is set so as to vary alternately at regular intervals. However, this is not always limitative. For example, as disclosed in JP-A-2000-346673, in case where there is employed a magnetizing pattern in which S poles, N poles and non-magnetized areas are arranged so as to repeat one another, not only the rotation speed but also the rotation direction can be detected. In brief, a desired magnetizing pattern may be employed according to the function that is required.

In any case, in view of the fact that a permanent magnet is used as the encoder 13a, on the sensor unit 20' mounted into the mounting hole 15a of the outer ring 1, there is not disposed such a permanent magnet 28 as shown in FIG. 2. That is, in the case of the sensor unit 20', a magnet detect element 27 and a waveform shaping circuit 29 functioning as the rotation detecting sensor 25a, and a temperature sensor 26 are disposed within (embedded into and supported by) the sensor unit 20'. The structures and operations of the remaining portions of the fifth embodiment are similar to those of the first embodiment shown in FIGS. 1 and 2. Therefore, the equivalent parts thereof are given the same designations and thus the duplicate description thereof is omitted here.

Figure 11:
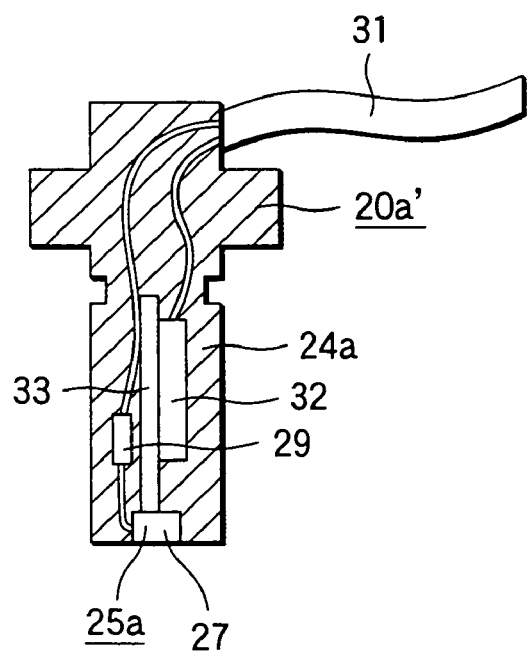
FIG. 11 is a section view of a sensor unit to be incorporated into a sixth embodiment according to the invention.

Next, FIG. 11 shows a sixth embodiment according to the invention. In the case of a sensor unit 20a' used in the present embodiment, within a holder 24a formed of synthetic resin, there are disposed (embedded and supported) not only a magnet detect element 27 and a waveform shaping circuit 29 cooperating together in forming a rotation detecting sensor 25a, but also a vibration sensor 32 which serves as a second sensor. Except that no permanent magnet is incorporated into the rotation detecting sensor 25a because the encoder 13a (see FIG. 9) is formed of a permanent magnet, the present embodiment is similar to the previously described second embodiment shown in FIG. 3. Therefore, the equivalent parts thereof are given the same designations and thus the duplicate description thereof is omitted here.

Figure 12:
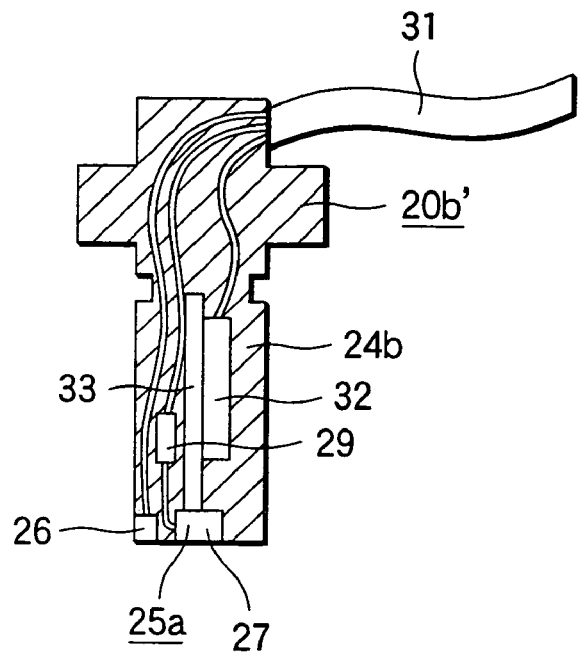
FIG. 12 is a section view of a sensor unit to be incorporated into a seventh embodiment according to the invention.

Next, FIG. 12 shows a seventh embodiment according to the invention. In the case of a sensor unit 20b' used in the present embodiment, within a holder 24b formed of synthetic resin, there are disposed (embedded and supported) not only a rotation detecting sensor 25a but also a temperature sensor 26 and a vibration sensor 32 which respectively function as second sensors. Except that no permanent magnet is incorporated into the rotation detecting sensor 25a because a permanent magnet is used as the encoder 13a (see FIG. 9), the present embodiment is similar to the previously described third embodiment shown in FIG. 7. Therefore, the equivalent parts thereof are given the same designations and thus the duplicate description thereof is omitted here.

Figure 13:
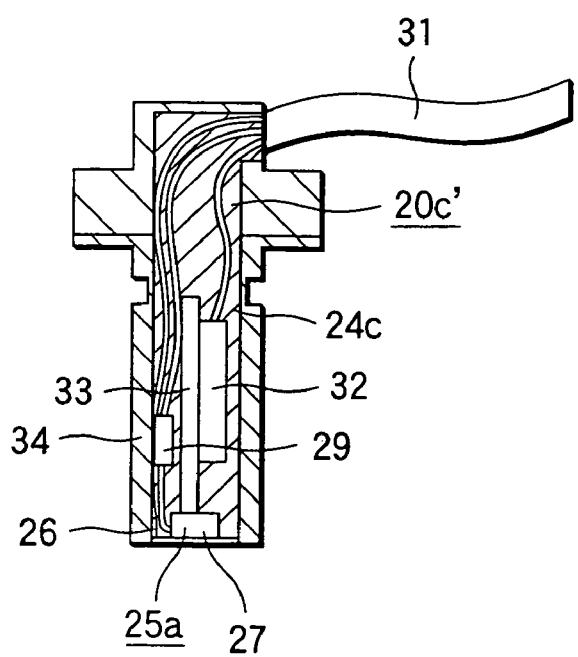
FIG. 13 is a section view of a sensor unit to be incorporated into an eighth embodiment according to the invention.

Next, FIG. 13 shows an eighth embodiment according to the invention. In the case of a sensor unit 20c' used in the present embodiment, a synthetic-resin-made holder 24c embeddedly supporting a rotation detecting sensor 25a and a vibration sensor 32 is held within a case 34 made of non-magnetic metal such as aluminum, copper, or non-magnetic stainless steel.

Except that no permanent magnet is incorporated into the rotation detecting sensor 25a because a permanent magnet is used as the encoder 13a (see FIG. 9), the present embodiment is similar to the previously described fourth embodiment shown in FIG. 8. Therefore, the equivalent parts thereof are given the same designations and thus the duplicate description thereof is omitted here.

In the structures respectively employed in the above-mentioned embodiments shown in FIGS. 2, 3, 7, 8, 10–13, the spaces for installation of the respective sensor units 20, 20a, 29b, 20c, 20', 20a', 29b', 20c' are extremely limited. Especially, as shown in FIGS. 1 and 9, in the structures in which the respective sensor units 20, 20a, 29b, 20c, 20', 20a', 29b', 20c' are interposed between the rolling elements such as the balls 8, 8, in case where the inside diameter of the mounting hole 15a for insertion of the sensor units 20, 20a, 29b, 20c, 20', 20a', 29b', 20c' increases, the rolling bearing unit increases in size in order to secure the strength of the outer ring 1, which increases the manufacturing cost of the rolling bearing unit and raises structural problems such as the reduction in rigidity of the rolling bearing unit. To cope with these problems, preferably, parts large in size such as the vibration sensors 32, 32a–32f and waveform shaping circuit 29 shown in FIGS. 4A to 6C, with respect to the axial direction of the holders 24, 24a–24c, may be disposed in series with the magnet detect element 27 (in case where the permanent magnet 28 is disposed, in series with the permanent magnet 28 as well) and nearer to the base end side (in FIGS. 2, 3, 7, 8, 10–13) than these components 27, 28, thereby reducing the diameter of the holes 24, 24a–24c which are to be inserted into the mounting hole 15a.

While the preferred embodiments of a wheel rotation detecting device according to the invention are as described hereinbefore, by using a wheel rotation detecting device according to the invention, the abnormality detection of a wheel supporting rolling bearing unit can be executed with high reliability. Description will be given below of the reasons for this and five specific examples of a circuit used to detect the abnormality. By the way, to detect the abnormality of the rolling bearing unit, conventionally, there is generally used a method in which a temperature sensor is assembled to the rolling bearing unit and, in accordance with a temperature signal detected by the temperature sensor, the presence or absence of the abnormality is judged. However, in this conventional method for detecting the presence or absence of the abnormality by detecting the temperature, the abnormality caused by an increase in the temperature due to poor lubrication such as deteriorated grease can be detected, but it is difficult to detect an abnormality caused by a micro flaking produced in the rolling contact surface of the rolling bearing.

Also, in the case of a rolling bearing unit which is incorporated into the rotation support part of a moving body such as a car, since the rolling bearing unit is not rotated at a constant speed all the time, generation of heat due to the friction loss of the rolling bearing unit is not constant. In other words, even in the case of a normal rolling bearing unit, the temperature thereof always varies according to variations in the rotation speed thereof, which makes it difficult to judge the presence or absence of the abnormality of the rolling bearing unit only by detecting the temperature variations. That is, the threshold value of the temperature for judgment of the presence or absence of the abnormality of the rolling bearing unit must be specified with the high-speed rotation time, in which the temperature rises, as a reference; and, therefore, in many cases, it is impossible to detect the abnormality that occurs in the low-speed operating time. Under these circumstances, there is a demand to establish a technique which can judge the abnormality detection of the rolling bearing unit with other elements than the temperature taken into account to thereby be able to enhance the detection accuracy of the abnormality. A wheel rotation detecting device according to the invention provides a structure which is ideal for detection of the abnormality with enhanced accuracy.

Thus, in order to meet the above demand, according to the invention, there is provided a processor for processing signals obtained in a wheel rotation detecting device according to the invention. Now, description will be given below of five specific examples of the present processor.

Figure 14:
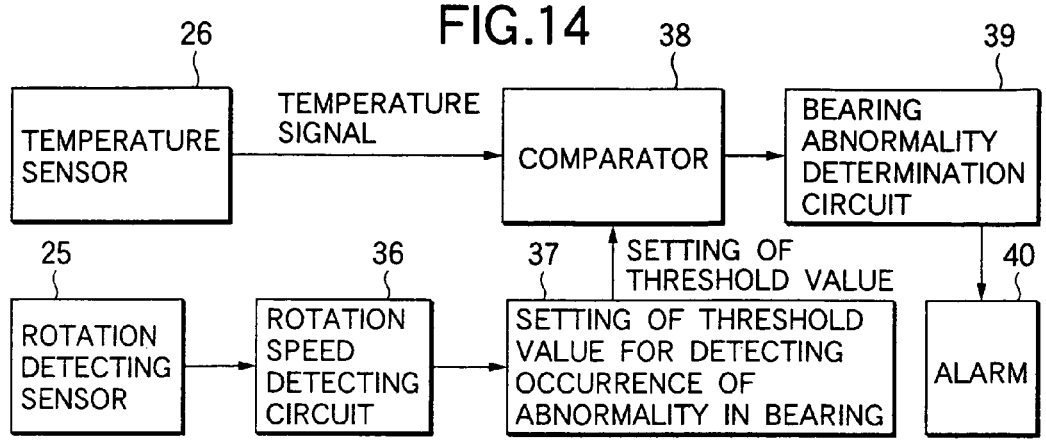
FIG. 14 is a block diagram of a first example of a circuit used to detect the abnormality of a rolling bearing unit.

Firstly, FIG. 14 is a block diagram of a first example of the processor. The first example judges whether an abnormality is present or not in the rolling bearing unit from the rotation speed of a rotary ring of a rolling bearing unit that can be obtained from the detect signal of the rotation detecting sensor 25 and also from the temperature of the rolling bearing unit that can be obtained from the detect signal of the temperature sensor 26. In the first example, in accordance with a speed signal representing a value on the rotation speed of the rotary ring that is obtained by a rotation speed detecting circuit 36 for processing the detect signal of the rotation detecting sensor 25, a threshold value setting circuit 37 determines a threshold value for detection of the abnormality. And, a comparator 38 compares this threshold value with the temperature signal transmitted from the temperature sensor 26, and a bearing abnormality determination circuit 39 checks a signal representing the above comparison result to thereby judge the presence or absence of the abnormality in the rolling bearing unit. Then, if the abnormality is present, a signal is transmitted to an alarm 40 such as a buzzer or a warning light to thereby operate the alarm 40, so that the alarm 40 gives the driver an alarm that notifies the occurrence of the abnormality. In the thus-structured processor according to the present example, in accordance with variations in the rotation speed of the rolling bearing unit that can be obtained from the detect signals of the rotation detecting sensor 25, the threshold value of the temperature for detection of the abnormality is varied sequentially (that is, the threshold value is increased as the rotation speed is increased), thereby being able to detect the abnormality of the rolling bearing unit which occurs not only in the high-speed rotation time but also in the low-speed rotation time.

Figure 15:
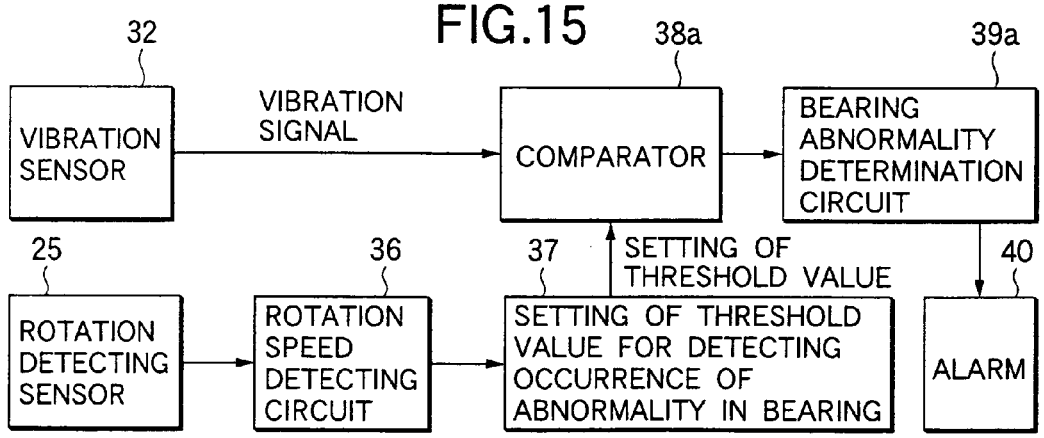
FIG. 15 is a block diagram of a second example of the above circuit.

Next, FIG. 15 is a block diagram of a second example of the present processor. The second example also judges whether an abnormality is present or not in the rolling bearing unit from the rotation speed of a rotary ring of a rolling bearing unit that can be obtained from the detect signal of the rotation detecting sensor 25 and from the vibration of a rolling bearing unit that can be obtained from the detect signal of the vibration sensor 32. In the second example, a threshold value for detection of an abnormality relating to the vibration is set in accordance with a speed signal which can be obtained from the detect signal of the rotation detecting sensor 25, a comparator 38a compares this threshold value with a signal from the vibration sensor 32, and a bearing abnormality determination circuit 39a judges the presence or absence of the abnormality in the rolling bearing unit. In the thus-structured processor according to the present example, in accordance with variations in the rotation speed of the rolling bearing unit, the threshold value of the vibration for detection of the abnormality is varied sequentially (that is, the threshold value is increased as the rotation speed is increased), thereby being able to detect the abnormal vibration of the rolling bearing unit which occurs in the low-speed rotation time. Therefore, it is possible to detect in an early stage even a slight flaking which is produced in the rolling contact surface of the rolling bearing unit.

That is, generally, the vibration occurring in the operating time of the rolling bearing unit increases as the rotation speed increases. For this reason, when judging the presence or absence of the abnormality of the rolling bearing unit only from the detect signal of the vibration sensor, the threshold value for detection of the abnormality need to be set in correspondence to the value of vibrations occurring in the time when the rotation speed is the largest that can be expected. Due to this, it is difficult to detect the abnormality of the rolling bearing unit in the low-speed rotation time. On the other hand, with use of a processor according to the present example, since the threshold value for detection of the abnormality can be varied sequentially according to the then rotation speed, the abnormality such as the flaking can be detected with high reliability in accordance with the level of the vibration.

Figure 16:
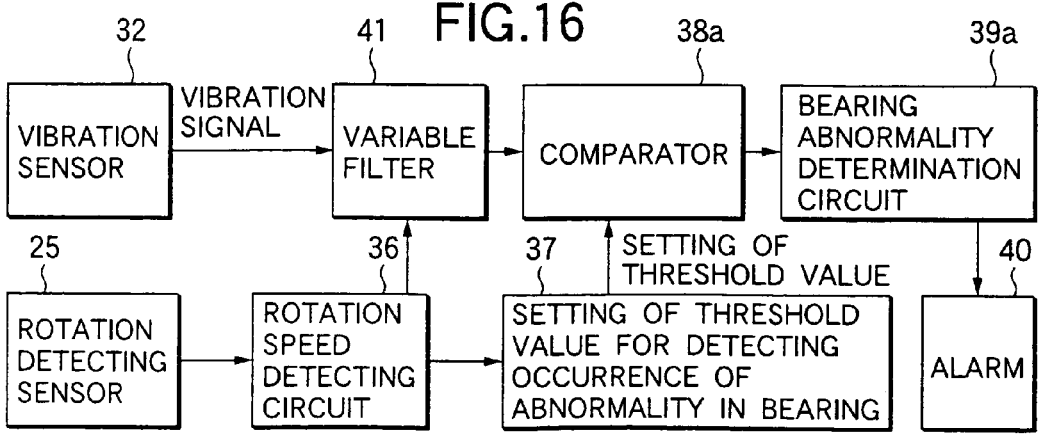
FIG. 16 is a block diagram of a third example of the above circuit.

Next, FIG. 16 is a block diagram of a third example of the processor. The third example also judges whether an abnormality is present or not in the rolling bearing unit from the rotation speed of a rotary ring of a rolling bearing unit that can be obtained from the detect signal of the rotation detecting sensor 25 and from the vibration of a rolling bearing unit that can be obtained from the detect signal of the vibration sensor 32. Especially, in the third example, a signal, which is issued from the vibration sensor 32 and represents the vibration of the rolling bearing unit, is passed through a variable filter 41. This variable filter 41 varies a removing frequency or a damping frequency in accordance with a signal which can be obtained from the detect signal of the rotation detecting sensor 25 for representation of the rotation speed of the rolling bearing unit. A vibration value, which is obtained after the rotation speed component of the rolling bearing unit is removed or dampened, is compared with a threshold value for detection of the abnormality obtained similarly to the previously described second example by a comparator 38a, and a bearing abnormality determination circuit 39a judges whether an abnormality is present or not in the rolling bearing unit.

In the case of the vibration which occurs while a rolling bearing unit is rotating, generally, the value of the vibration of the rotation speed component synchronized with the rotation speed is the largest; however, in case where damage such as a flaking occurs at raceways or rolling element surfaces of the rolling bearing unit, the value of the vibration of the frequency component not synchronized with the rotation speed increases. In view of this, in the present example, by passing the signal representing the vibration of the rolling bearing unit through the variable filter 41 which varies the removing or damping frequency based on the signal of the rotation detecting sensor 25, the vibration value of the frequency corresponding to the rotation speed component is removed or dampened. Therefore, the vibration represented by the signal after passage through the variable filter 41, even in the normal state thereof, contains no frequency component or only a slight frequency component if any; and thus, the component of the vibration occurring due to the presence of an abnormality can be detected more clearly accordingly. This makes it possible to enhance the accuracy of detection of the presence or absence of the abnormality in the rolling bearing unit. In other words, in an early stage where a flaking starts to occur in the rolling contact portion of the rolling bearing unit, the abnormality of the rolling bearing unit can be detected, which can prevent serious damage such as seizure from occurring in the rolling bearing unit.

Figure 17:
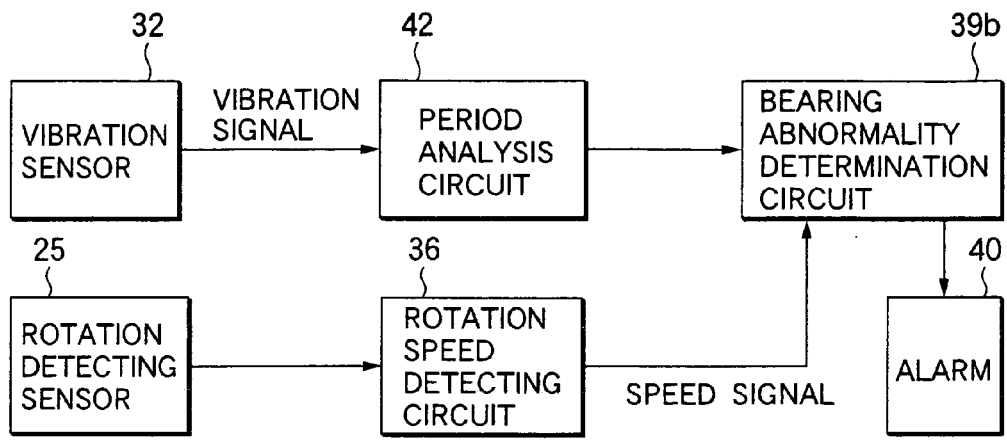
FIG. 17 is a block diagram of a fourth example of the above circuit.

Next, FIG. 17 is a block diagram of a fourth example of the processor. The fourth example also judges whether an abnormality is present or not in the rolling bearing unit from the rotation speed of a rotary ring of a rolling bearing unit that can be obtained from the detect signal of the rotation detecting sensor 25 and from the vibration of a rolling bearing unit that can be obtained from the detect signal of the vibration sensor 32. Especially, in the fourth example, a period analysis circuit 42 is used to analyze the period of a vibration waveform detected by the vibration sensor 32, thereby being able to judge whether any abnormality is present or not in the rolling bearing unit. More specifically, to attain this purpose, in the present example, a bearing abnormality determination circuit 39b, in accordance with a rotation speed signal which can be obtained from the detect signal of the rotation detecting sensor 25 to represent the rotation speed of the rolling bearing unit, calculates the periods $T_1$, $T_2$, $T_3$ of various kinds of vibrations generated from the rolling bearing unit and judges whether any abnormality is present or not in the rolling bearing unit. By the way, referring more specifically to the respective periods $T_1$, $T_2$, $T_3$, in case where the rolling bearing unit is used in such a manner that its inner ring rotates, $T_1$ expresses the period of the vibrations generated when a flaking occurs in an outer ring raceway formed in the inner peripheral surface of an outer ring serving as a stationary ring, $T_2$ expresses the period of the vibrations generated when a flaking occurs in an inner ring raceway formed in the outer peripheral surface of an inner ring serving as a rotary ring, and $T_3$ expresses the period of the vibrations generated when a flaking occurs in the rolling surface of a rolling element, respectively. In case where the period of the signal from the vibration sensor 32 is analyzed using the rotation speed signal, not only it can be checked whether damage due to the flaking has occurred or not in the rolling bearing unit, but also it is possible to specify the portion (inner ring raceway, outer ring raceway or rolling elements) of the rolling bearing unit where the flaking has occurred.

For example, when the rolling bearing unit is used in such a manner that its inner ring rotates, in case where a flaking is caused in the outer ring raceway formed in the inner peripheral surface of the outer ring serving as the stationary ring, there are generated vibrations having the period expressed by the following expression.

That is, $T_1 = 1/f_1 = 1/(z \cdot fc)$ where $f_1$: the frequency of the vibration, z: the number of rolling elements, and fc: the frequency of the rotation of a retainer.

On the other hand, in case where a flaking is caused in the inner ring raceway formed in the outer peripheral surface of the inner ring serving as the rotary ring, there are generated vibrations having the period expressed by the following expression.

That is, $T_2 = 1/f_2 = 1/\{z \cdot (fr - fc)\}$ where $f_2$: the frequency of the vibration, z: the number of rolling elements, fr: the frequency of the inner ring, and fc: the frequency of the rotation of a retainer.

Further, in case where a flaking is caused in the rolling surface of the rolling element, there are generated vibrations having the period expressed by the following expression.

That is, $T_3 = 1/f_3 = 1/(2 \cdot fb)$ where $f_3$: the frequency of the vibration and fb: the frequency of the rotation of the rolling element about its own axis.

In these cases, the frequencies fc, fr, fb can be calculated, provided that the specifications of the rolling bearing unit and the rotation number thereof are known. Therefore, by analyzing the period of the vibration waveform, it is possible to specify the portion (outer ring raceway, inner ring raceway or rolling element surfaces) of the rolling bearing unit where the flaking has occurred.

Figure 18:
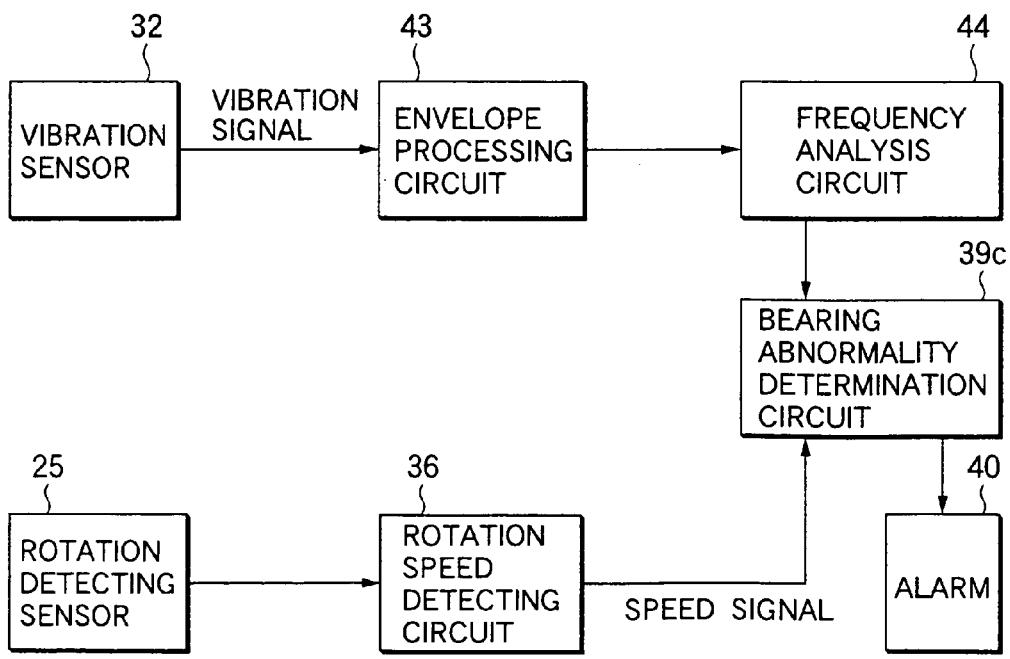
FIG. 18 is a block diagram of a fifth example of the above circuit.
Figure 19:
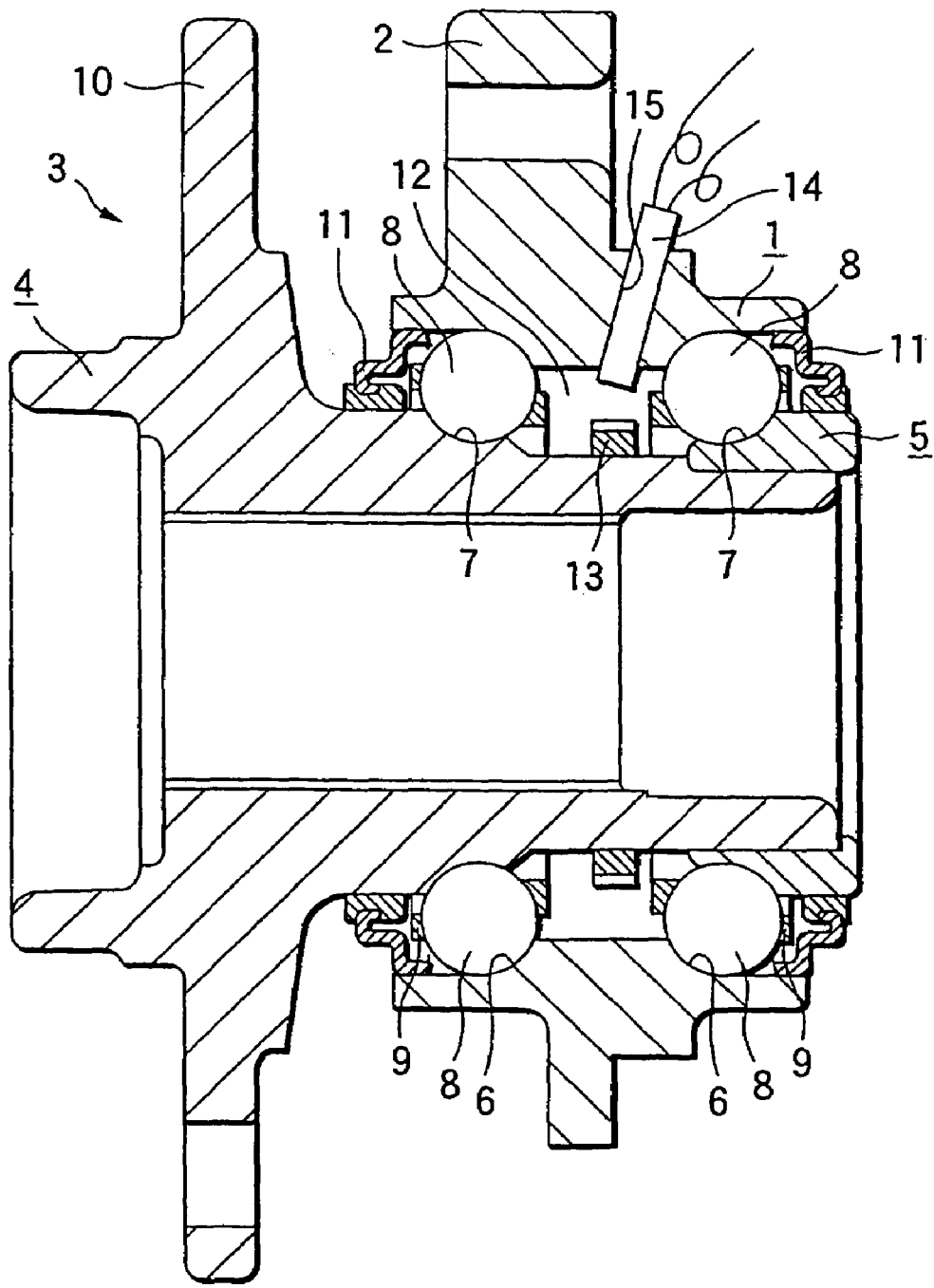
FIG. 19 is a section view of an example of a structure of the related art.

Next, FIG. 18 is a block diagram of a fifth example of the processor. In the fifth example as well, a bearing abnormality determination circuit 39c judges whether an abnormality is present or not in the rolling bearing unit from the rotation speed of a rotary ring of a rolling bearing unit that can be obtained from the detect signal of the rotation detecting sensor 25 and from the vibration of a rolling bearing unit that can be obtained from the detect signal of the vibration sensor 32. Especially, in the fifth example, the waveform itself of the vibration detected by the vibration sensor 32 is envelope processed by an envelope processing circuit 43 and, using the thus processed waveform, a frequency analysis circuit 44 analyzes the frequency of the vibration to thereby enhance the accuracy of the frequency analysis.

By the way, in case where a vibration component having other frequencies than the frequencies fc, fr, fb respectively corresponding to the respective periods $T_1$, $T_2$, $T_3$ described in the fourth example increases, it is considered that an abnormality has occurred in the other portion of the rolling bearing unit than the rolling contact surface thereof. Therefore, in case where the period of the detect signal of the vibration sensor 32 or the frequency thereof is analyzed by a period analysis circuit 42 or a frequency analysis circuit 44, it is possible to detect the abnormalities that have occurred in the rotation support part of the car and its peripheral portions that include the rolling bearing unit and its peripheral portions. In this case, for example, in case where the primary component of the rotation speed has increased outstandingly, it is possible to predict a possibility that localized wear has occurred in a single portion of the wheel or tire due to the travelling of the car.

At any rate, in case where the setting of the threshold value for detection of the abnormality in the rolling bearing unit, or the setting of the period or frequency of the vibration to be analyzed is varied sequentially according to variations in the rotation speed using the five examples of a process circuit respectively shown in FIGS. 14 to 18, it is possible to set the optimum threshold value or the optimum period or frequency of the vibration corresponding to the state of the rolling bearing unit varying minute by minute, thereby being able to greatly enhance the accuracy of judgement of the presence or absence of the abnormality in the rolling bearing unit.

By the way, in a structure where not only the rotation detecting sensor but also the vibration sensor and temperature sensor are combined together, the abnormality of the rolling bearing unit can be detected from both of the temperature and vibration signals. Therefore, the abnormality such as poor lubrication due to the deteriorated lubricant (grease, oil) or the flaking of the rolling contact surface due to the biting of foreign substances can be detected widely. According to the above-mentioned rolling bearing unit abnormality detect apparatus, since the wheel rotation detecting device according to the invention, which provides a signal detect part, incorporates therein not only the rotation detecting sensor for detecting the rotation speed but also, as a sensor for detecting the abnormality of the rolling bearing unit, at least one of the vibration sensor and temperature sensor, the abnormality of the rolling bearing unit can be detected in an early stage thereof, which makes it possible to effectively prevent the occurrence of serious damage such as seizure in the present rolling bearing unit.

Since a wheel rotation detecting device according to the invention is structured and operates in the above-mentioned manner, it is possible to realize a structure which, while controlling an increase in the manufacturing cost and weight thereof, can detect not only the rotation speed and rotation number of the wheel but also the temperature and vibration of the wheel supporting rolling bearing. And, the wheel rotation detecting device of the invention is able to contribute toward realizing not only the ABS and TCS but also a system which can predict the abnormality of the wheel supporting rolling bearing, variations in the road condition and in the air pressure of the tire, and acceleration or deceleration conditions to thereby control the running state of the car in the optimum manner. Also, since the rotation detecting sensor and other sensors are formed as an integral body and are thereby structured compact, the installation space for the sensors can be reduced and each of these sensors can be replaced with an existing rotation detecting sensor, it is not necessary to re-design the wheel supporting rolling bearing unit portion of the car and the present wheel rotation detecting device can be realized at a low cost.

While only certain embodiments of the invention have been specifically described herein, it will apparent that numerous modifications may be made thereto without departing from the spirit and scope of the invention.

What is claimed is:

1. A wheel rotation detecting device, comprising:
   a rolling bearing unit including:
   a stationary ring supported on a suspension of a body and being unrotatable in use;
   a rotary ring supporting a wheel thereon and being rotatable with said wheel for moving the body in a traveling direction; and
   a plurality of rolling elements respectively rollably interposed between a stationary side raceway formed in a peripheral surface of said stationary ring and a rotary side raceway formed in a peripheral surface of said rotary ring;
   an encoder supported on said rotary ring or on a part mounted on said rotary ring and being rotatable with said rotary ring;
   a rotation detecting sensor supported on said stationary ring or a part mounted on said stationary ring in such a manner as to be opposed to said encoder, for detecting the rotation of said rotary ring;
   an acceleration sensor for detecting the vibration of said rolling bearing unit; and
   a control unit, wherein
   an acceleration or deceleration of the moving body is detected by the control unit on the basis of a signal of the acceleration sensor, and
   said acceleration sensor is one that detects vibration in a the traveling direction of the body.

2. The wheel rotation detecting device according to claim 1, wherein said acceleration sensor is one that detects vibrations at least in two directions.

3. The wheel rotation detecting device according to claim 1, wherein said acceleration sensor is one that detects vibrations in three directions.

4. The wheel rotation detecting device according to claim 1, wherein said encoder is magnetized along a circumferential direction thereof and said encoder includes S and N poles disposed on a peripheral surface thereof such that said S and N poles are alternately situated at regular intervals along the circumferential direction thereof.

5. The wheel rotation detecting device according to claim 4, wherein said rotation detecting sensor includes a magnetic detection element and a waveform shaping circuit and does not include a permanent magnet.

6. The wheel rotation detecting device according to claim 1, wherein said encoder is magnetized along a circumferential direction thereof and said encoder includes S and N poles and a non-magnetized area disposed on a peripheral surface thereof so as to repeat one another at regular intervals along the circumferential direction thereof.

7. The wheel rotation detecting device according to claim 1, wherein said wheel rotation detecting device further includes a variable filter passing a signal detected by said acceleration sensor, wherein the variable filter varies a removing frequency or a damping frequency in accordance with the rotation speed.

8. The wheel rotation detecting device according to claim 1, wherein the acceleration sensor is disposed within a holder holding said rotation detecting sensor.

9. The wheel rotation detecting device according to claim 8, wherein said acceleration sensor is disposed in series with said rotation detecting sensor in an axial direction of said holder, and nearer to a base end side of said holder than said rotation detecting sensor in the axial direction of said holder.

10. The wheel rotation detecting device according to claim 9, wherein said holder holding said rotation detecting sensor and said acceleration sensor is made of synthetic resin.

11. The wheel rotation detecting device according to claim 1 wherein the acceleration sensor is arranged such that an output therefrom provides a basis for automatically adjusting an attenuation amount of a damper mounted on the suspension apparatus.

12. The wheel rotation detecting device according to claim 1 wherein the acceleration sensor is arranged such that an output therefrom provides a basis for automatically adjusting an output of the engine.

13. The wheel rotation detecting device according to claim 1, wherein the control unit controls an antilock brake system of a car.

14. The wheel rotation detecting device according to claim 1, wherein the control unit controls a traction control system of a car.

15. The wheel rotation detecting device according to claim 1, further wherein said acceleration sensor is one that also detects vibration in a direction transverse to the traveling direction of the body.

16. A wheel rotation detecting device, comprising:
a rolling bearing unit including:
a stationary ring supported on a suspension of a body and being unrotatable in use;
a rotary ring supporting a wheel thereon and being rotatable with said wheel for moving the body in a traveling direction; and
a plurality of rolling elements respectively rollably interposed between a stationary side raceway formed in a peripheral surface of said stationary ring and a rotary side raceway formed in a peripheral surface of said rotary ring;
an encoder supported on said rotary ring or on a part mounted on said rotary ring and being rotatable with said rotary ring;
a rotation detecting sensor supported on said stationary ring or a part mounted on said stationary ring in such a manner as to be opposed to said encoder, for detecting the rotation of said rotary ring;
an acceleration sensor for detecting the vibration of said rolling bearing unit, and
a control unit, wherein
an acceleration or deceleration condition of the moving body is detected by the control unit on the basis of a signal of the acceleration sensor, and said acceleration sensor is one that detects vibration in a direction transverse to the traveling direction of the body.

17. The wheel rotation detecting device according to claim 16, wherein said acceleration sensor is one that detects vibrations in two directions.

18. The wheel rotation detecting device according to claim 16, wherein said acceleration sensor is one that detects vibrations in three directions.

19. The wheel rotation detecting device according to claim 16, wherein said encoder is magnetized along a circumferential direction thereof and said encoder includes S and N poles disposed on a peripheral surface thereof such that said S and N poles are alternately situated at regular intervals along the circumference thereof.

20. The wheel rotation detecting device according to claim 19, wherein said rotation detecting sensor includes a magnetic detection element and a waveform shaping circuit and does not include a permanent magnet.

21. The wheel rotation detecting device according to claim 16, wherein said encoder is magnetized along a circumferential direction thereof and said encoder includes S and N poles and non-magnetized areas disposed on a peripheral surface thereof so as to repeat one another at regular intervals along the circumferential direction thereof.

22. The wheel rotation detecting device according to claim 16, wherein said wheel rotation detecting device further includes a variable filter passing a signal detected by said acceleration sensor wherein the variable filter varies a removing frequency or a damping frequency in accordance with the rotation speed.

23. The wheel rotation detecting device according to claim 16, wherein said acceleration sensor is disposed within a holder holding said rotation detecting sensor.

24. The wheel rotation detecting device according to claim 23, wherein said acceleration sensor is disposed in series with said rotation detecting sensor in an axial direction of said holder, and nearer to a base end side holder than said rotation detecting sensor in the axial direction of said holder.

25. The wheel rotation detecting device according to claim 23, wherein said holder holding said rotation detecting sensor and said acceleration sensor is made of synthetic resin.

26. The wheel rotation detecting device according to claim 16, wherein the acceleration sensor is arranged such that an output therefrom provides a basis for automatically adjusting an attenuation amount of a damper mounted on the suspension apparatus.

27. The wheel rotation detecting device according to claim 16, wherein the acceleration sensor is arranged such that an output therefrom provides a basis for automatically adjusting an output of the engine.

28. The wheel rotation detecting device according to claim 16, wherein the control unit controls an antilock brake system of a car.

29. The wheel rotation detecting device according to claim 16, wherein the control unit controls a traction control system of a car.

30. The wheel rotation detecting device according to claim 16, further wherein said acceleration sensor is one that also detects vibration in a longitudinal direction of the body.

* * * * *